United States Patent [19]

Kobayashi

[11] Patent Number: 5,042,203
[45] Date of Patent: Aug. 27, 1991

[54] ABRASIVE DISC EXCHANGE APPARATUS FOR USE IN VERTICAL-SPINDLE GRINDING MACHINE

[75] Inventor: Shigeo Kobayashi, Kanagawa, Japan
[73] Assignee: Nippei Toyama Corp., Tokyo, Japan
[21] Appl. No.: 428,723
[22] Filed: Oct. 30, 1989
[51] Int. Cl.$^5$ .............................................. B24B 7/00
[52] U.S. Cl. .......................... 51/111 R; 51/166 MH; 409/232; 409/234; 29/568
[58] Field of Search ......... 51/111 R, 166 R, 166 MH; 29/568, 563; 409/232, 233, 234

[56] References Cited

U.S. PATENT DOCUMENTS 4,759,115 7/1988 Kielma .................................. 409/233

*Primary Examiner*—M. Rachuba
*Attorney, Agent, or Firm*—Sughrue, Mion, Zinn, Macpeak & Seas

[57] ABSTRACT

An abrasive disc exchange apparatus for use in a vertical spindle grinding machine includes a cover member surrounding an abrasive disc, and has an opening disposed in a radial direction of the abrasive disc for the passage of the abrasive disc therethrough. The cover member has a lid for closing the opening, and the lid is movable into an open position where the lid opens the opening. A guide rail accommodating device is provided for accommodating a guide rail. A support device is provided for holding the guide rail horizontally so as to allow the guide rail to extend toward the spindle housing when the lid is moved to its open position. An abrasive disc-carrying slide carries each of the upper and lower abrasive discs, and is engageable with the guide rail for movement therealong into and out of the space below the spindle housing when the guide rail is disposed horizontally. The slide has a first positioning portion for holding the peripheral surfaces of the abrasive discs in a first predetermined position. Also, the abrasive disc exchange apparatus can be used in a vertical spindle double-head grinding machine, in which case the slide also has a second positioning portion for holding a second abrasive disc in a second position.

7 Claims, 8 Drawing Sheets

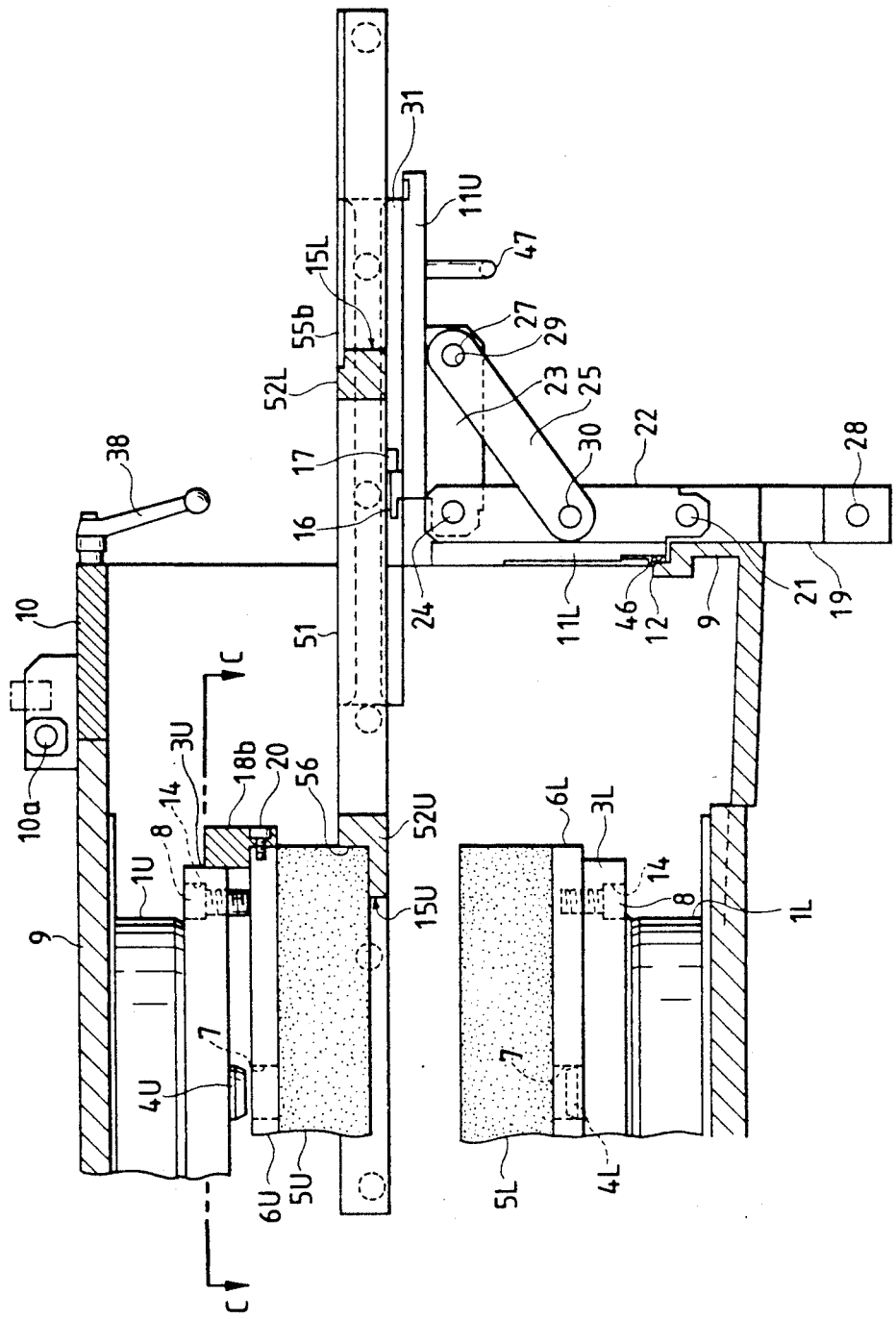

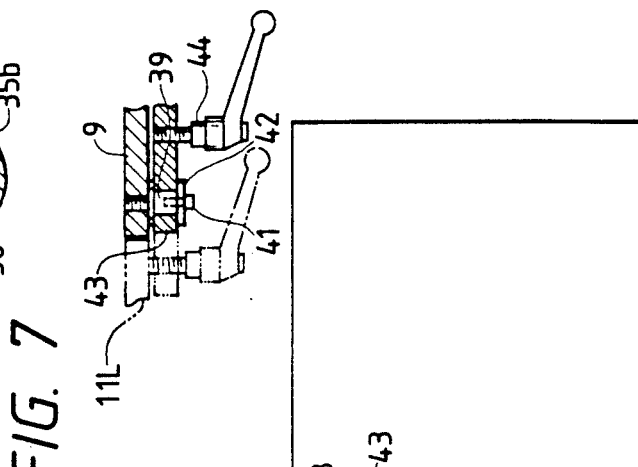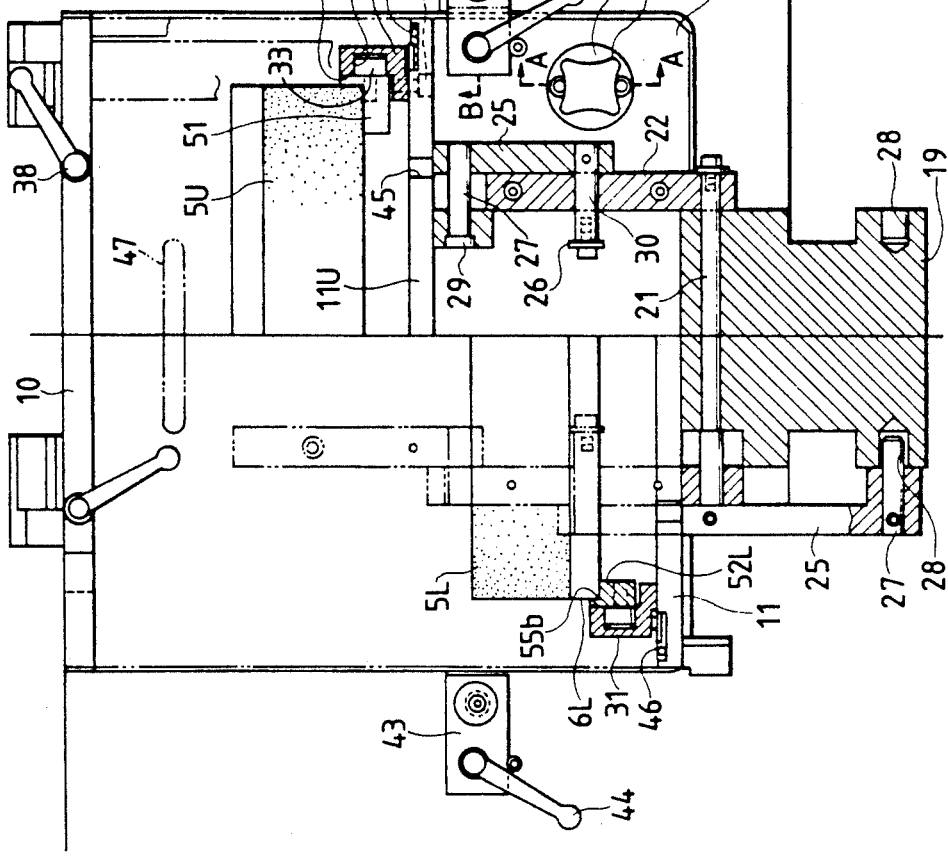

ABRASIVE DISC EXCHANGE APPARATUS FOR USE IN VERTICAL-SPINDLE GRINDING MACHINE

BACKGROUND OF THE INVENTION

1. Field of the Invention

This invention relates to an apparatus for exchanging abrasive disc or stones in a vertical-spindle grinding machine.

2. Prior Art

Conventionally, when exchanging an abrasive disc in a vertical-spindle double-head grinding machine, the abrasive disc lifted by a crane can not be brought directly into and out from a space between the opposed spindle housing. Therefore, when exchanging the abrasive disc, feed guide members, such as carriers for feeding a workpiece and/or through-feed blades, are removed. Then, a guide member for sliding contact with a face plate (by which the abrasive disc is fixed to the spindle housing) or one side (end face) of the abrasive disc is inserted into and supported by the machine frame. For example, the guide member comprises a guide plate 61 (FIG. 12) or parallel guide bars 62 (FIG. 13). The upper spindle housing is moved downward to place the upper abrasive disc 5U on the lower abrasive disc 5L, and the upper abrasive disc 5U is removed from the spindle and is placed on the guide member. Then, the upper abrasive disc 5U is slidingly moved over the guide member exteriorly of the machine frame, and is lifted by a crane. Then, the guide member is removed from the machine frame, and the lower abrasive disc 5L is moved upward and is disconnected from the spindle. Then, the guide member is inserted into and fixed to the machine frame, and the lower abrasive disc is placed on the guide member. Then, the lower abrasive disc 5L is slidingly moved over the guide member exteriorly of the machine frame, and is lifted by the crane. Next, for exchanging the lower abrasive disc 5L for a new one, the new abrasive disc 5L is caused to descend so that a face plate of the abrasive disc 5L is brought into contact with that portion of the guide member extending outwardly from the machine frame. Then, a abrasive disc-lifting member of the crane is released from the abrasive disc 5L, and the abrasive disc 5L is slidingly moved over the guide member toward the space between the two spindle housings. Then, the lower abrasive disc is mounted on the lower spindle housing. Then, the guide member is withdrawn or removed from the machine frame, and the lower spindle housing is moved downward. Then, the guide member is again inserted into and fixed to the machine frame, and similarly a new upper abrasive disc 5U is caused to descend by the crane and is placed on the guide member. Then, the upper abrasive disc 5U is slidingly moved over the guide member to come between the two spindle housings, so that the upper abrasive disc 5U is placed over the lower abrasive disc 5L, already mounted on the lower spindle housing, in overlapping relation thereto. Then, the guide member is removed from the machine frame, the upper spindle housing is moved downward toward the upper abrasive disc 5U, and the upper abrasive disc is attached to the upper spindle housing. Thereafter, the feed guide members for feeding the workpiece are again mounted on the machine.

The above prior art has the following problems:

(1) Since the abrasive discs of a heavy weight are caused to slide over the guide member, their face plate or the end face are damaged.

(2) Since the upper abrasive disc is placed over the lower abrasive disc in registry therewith and is slidingly moved relative thereto, there is a risk that the two abrasive discs are damaged, even if an interposing member is interposed between the two abrasive discs. Such an interposing member is made of wood or the like, and therefore it is very difficult to slide the abrasive disc over the interposing member.

(3) Since the guide member is merely inserted into the machine frame, it is difficult to preposition the abrasive disc with respect to the spindle housing when attaching the abrasive disc to the spindle housing. Therefore, much time is required in this respect, and at this time the face plate or the end face of the abrasive disc slides over the guide member or the lower abrasive disc back and forth and right and left, so that the face plate or the end face of the abrasive disc may be further damaged.

(4) Since the upper abrasive disc is placed over the lower abrasive disc, the abrasive disc can not be attached to the spindle housing if the feed guide member for feeding the workpiece is not removed from the machine.

(5) The attachment of the upper abrasive disc is cumbersome because it must be placed over the lower abrasive disc, and besides the upper and lower abrasive discs can not be replaced independently of each other.

(6) Since the abrasive disc is placed directly on the guide member and is pushed into the space between the two spindle housings, there is encountered a large resistance to the sliding movement of the abrasive disc over the guide member.

(7) The abrasive disc is merely placed on the guide member, and hence can be moved freely on the guide member. Therefore, care must be taken to prevent the abrasive disc from becoming disengaged from the guide member.

(8) The above-mentioned problem lowers the operability, and it is rather difficult to arrange the procedure of the operation.

The above problems (1), (3), (6), (7) and (8) are also encountered with a vertical-spindle single-head grinding machine.

SUMMARY OF THE INVENTION

With the above deficiencies of the prior art in view, it is an object of this invention to provide an abrasive disc exchange apparatus for use in a vertical-spindle grinding machine which apparatus provides an improved operability, will not damage the abrasive disc, and can effect a proper positioning of the abrasive disc.

According to one aspect of the present invention, there is provided an abrasive disc exchange apparatus for use in a vertical spindle double-head grinding machine comprising a pair of opposed upper and lower spindle housings and a pair of upper and lower abrasive discs releasably attached respectively to the upper and lower spindle housings, the apparatus comprising:

(a) a cover member surrounding the upper and lower abrasive discs and having an opening disposed in a radial direction of the upper and lower abrasive discs for the passage of the abrasive discs therethrough, the cover member having a lid for closing the opening, and the lid being movable into an open position where the lid opens the opening;

(b) a guide rail;

(c) guide rail accommodating means for accommodating the guide rail;

(d) support means for holding the guide rail horizontally so as to allow the guide rail to extend toward a space between the upper and lower spindle housings when the lid is moved to its open position; and (e) a abrasive disc-carrying slide capable of carrying each of the upper and lower abrasive discs, the slide being engageable with the guide rail for movement therealong into and out of the space between the upper and lower spindle housings when the guide rail is disposed horizontally, and the slide having a pair of first and second positioning portions provided respectively at opposite ends thereof for holding the peripheral surfaces of the upper and lower abrasive discs respectively in first and second predetermined positions.

According to another aspect of the invention, there is provided an abrasive disc exchange apparatus for use in a vertical spindle single-head grinding machine comprising a single spindle housing and an abrasive disc releasably attached to the spindle housing, the apparatus comprising:

(a) a cover member surrounding the abrasive disc and having an opening disposed in a radial direction of the abrasive disc for the passage of the abrasive disc therethrough, the cover member having a lid for closing the opening, and the lid being movable into an open position where the lid opens the opening;

(b) a guide rail;

(c) guide rail accommodating means for accommodating the guide rail;

(d) support means for holding the guide rail in a horizontal position so as to allow the guide rail to extend toward the spindle housing when the lid is moved to its open position; and (e) an abrasive disc-carrying slide capable of carrying the abrasive disc, the slide being engageable with the guide rail for movement therealong toward and away from the spindle housing when the guide rail is disposed horizontally, and the slide having a positioning portion provided at one end thereof for holding the peripheral surface of the abrasive disc in a predetermined position.

BRIEF DESCRIPTION OF THE DRAWINGS

FIGS. 3 and 4 are partly cross-sectional, side elevational views of the grinding machine, showing the operation of the abrasive disc exchange apparatus;

FIG. 5 is a partly cross-sectional, front-elevational view of the grinding machine;

FIG. 6 is a cross-sectional view taken along the line A—A of FIG. 5;

FIG. 7 is a cross-sectional view taken along the line B—B of FIG. 5;

DESCRIPTION OF THE PREFERRED EMBODIMENTS OF THE INVENTION

The invention will now be described with reference to the drawings.

Figure 1:
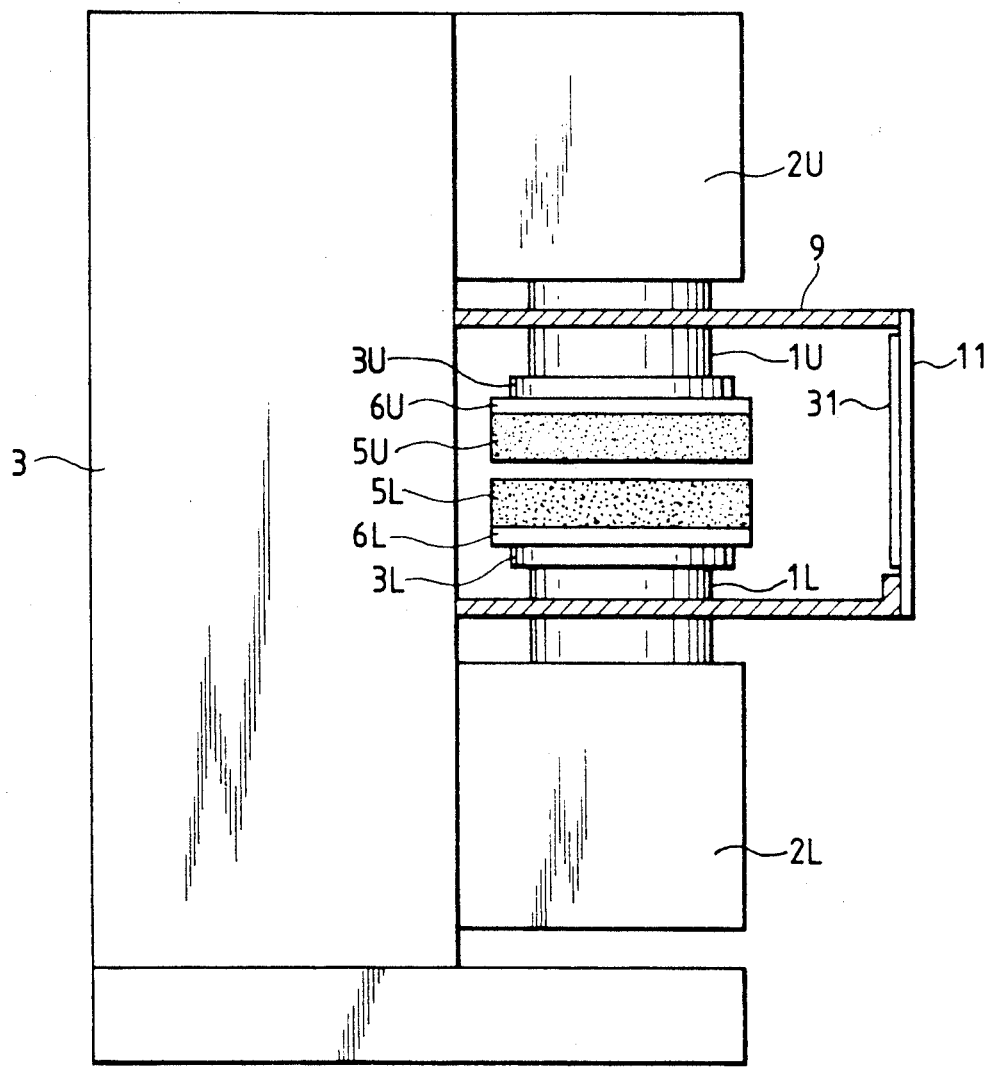
FIG. 1 is a side-elevational view of a vertical-spindle double-head grinding machine incorporating an abrasive disc exchange apparatus according to the present invention.

FIG. 1 is a side-elevational view of a vertical-spindle double-head grinding machine incorporating an abrasive disc exchange apparatus according to the present invention. A pair of opposed upper and lower spindles, having their respective housings 1U and 1L, are mounted on spindle housing bases 2U and 2L, respectively. Each of the upper and lower spindle housing is fixed in such a manner that the position of each spindle housing can be adjusted in a vertical direction. For adjusting the positions of the spindle housing, the spindle housing bases 2U and 2L are engaged with a guide means provided at one side of a column 3, and the spindle housing bases 2U and 2L are vertically moved by a drive device along the guide means. Alternatively, the spindle housing bases 2U and 2L are fixedly mounted on the column 3, each spindle is received in a quill, and the quill is moved outwardly and inwardly relative to the spindle base 2U, 2L.

Figure 2:
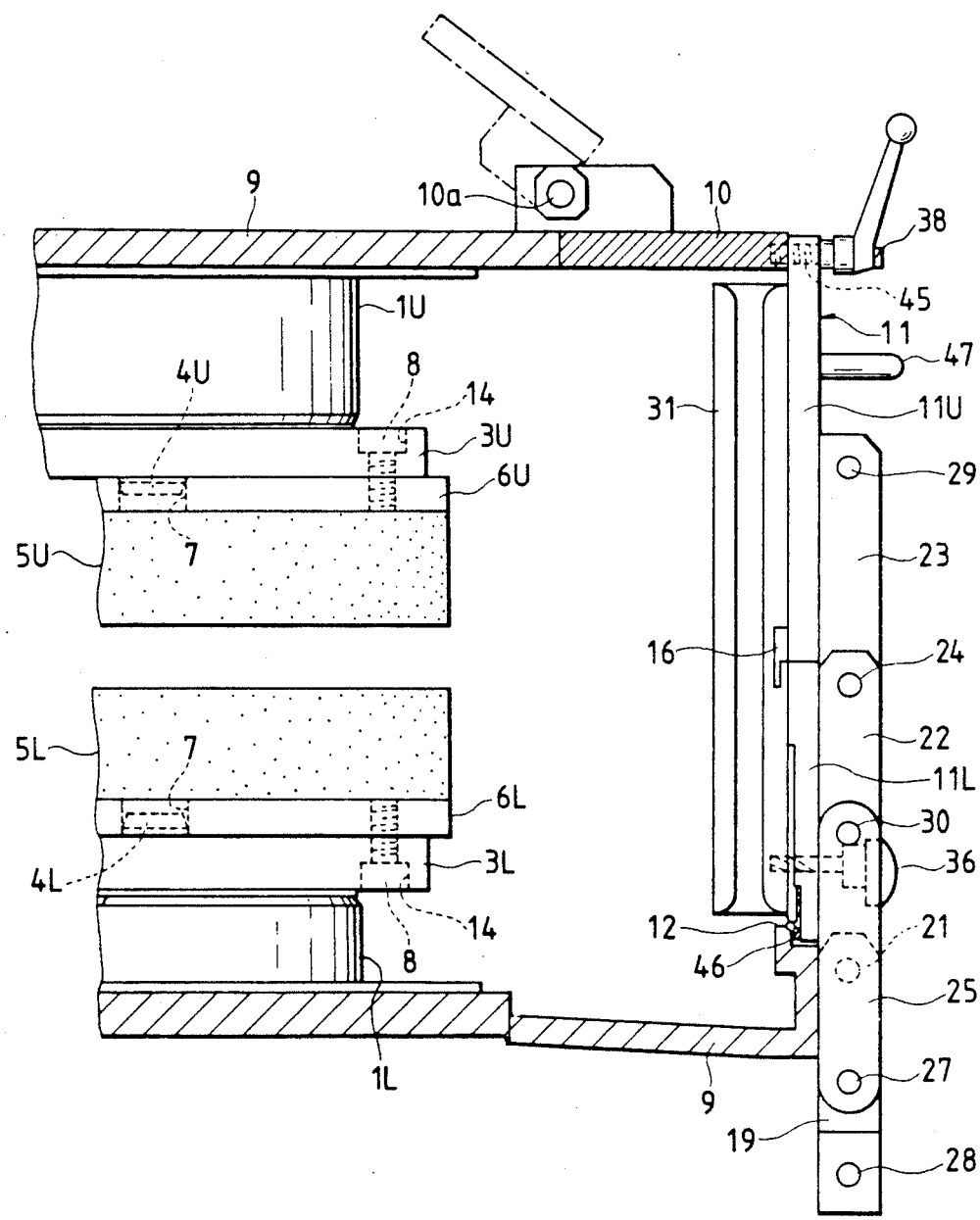
FIG. 2 is a fragmentary enlarged view of the grinding machine.

FIG. 2 shows a portion of the grinding machine in the vicinity of the two spindle housings. A pair of spindle housings 3U and 3L are fixedly mounted respectively to the ends (not shown) of the spindles appearing at the distal ends of the spindle housing. Centering projections 4U and 4L of a tapered shape are formed respectively on the opposed surfaces of the spindle housings 3U and 3L, and are disposed at the central portions of the housings 3U and 3L, respectively. The two centering projections 4U and 4L are fitted respectively in centering holes 7 and 7 formed in central portions of disc-shaped face plates 6U and 6L to which a pair of upper and lower abrasive discs 5U and 5L are fixedly secured, respectively. Thus, the centering of the abrasive discs 5U and 5L is achieved. Bolts 8 are passed through bolt holes 14 formed axially through the outer peripheral portion of the spindle flange 3U, 3L, and are threaded into the face plate 6U, 6L having the abrasive disc 5U, 5L secured thereto, thereby fixing the abrasive discs 5U and 5L respectively to the spindle housings 3U and 3L.

The opposed upper and lower abrasive discs 5U and 5L are spaced from each other by a distance equal to a value into which a workpiece (not shown) is ground. A feed guide member for feeding the workpiece into the space between the abrasive discs 5U and 5L is mounted between the opposed spindle housing bases 2U and 2L. That portion of the grinding machine disposed between the upper and lower spindle housing bases 2U and 2L and exposed to the exterior is covered by a cover member 9 which is either integral with or separate from the column 3. The cover member 9 includes an opening 12 disposed in the radial direction of the upper and lower abrasive discs 5U and 5L, and an openable lid 11 for closing the opening 12. The abrasive discs 5U and 5L secured respectively to the face plates 6U and 6L can be passed through the opening 12. There are provided a pair of guide rails 31 which are adapted to horizontally extend through the opening 12 toward the space between the two spindle housings when the lid 11 is opened. An abrasive disc-carrying slide 51 is adapted to be engaged with the pair of guide rails 31 so as to slidingly move therealong into and out of the space between the two spindle housings. The slide 51 has at one end a notch 15L for holding the end face of the lower abrasive disc 5L in a predetermined position. The slide 51 also has at the other end a notch 15U for holding the end face of the upper abrasive disc 5U in a predetermined position (see FIGS. 3, 4 and 8).

The pair of guide rails 31 are mounted on the cover member 9 through the lid 11, and are fixed to the back or inner surface of the lid 11. Therefore, when the lid 11 closes the opening 12, the guide rails 31 are accommodated within the cover member 9.

Figure 3:
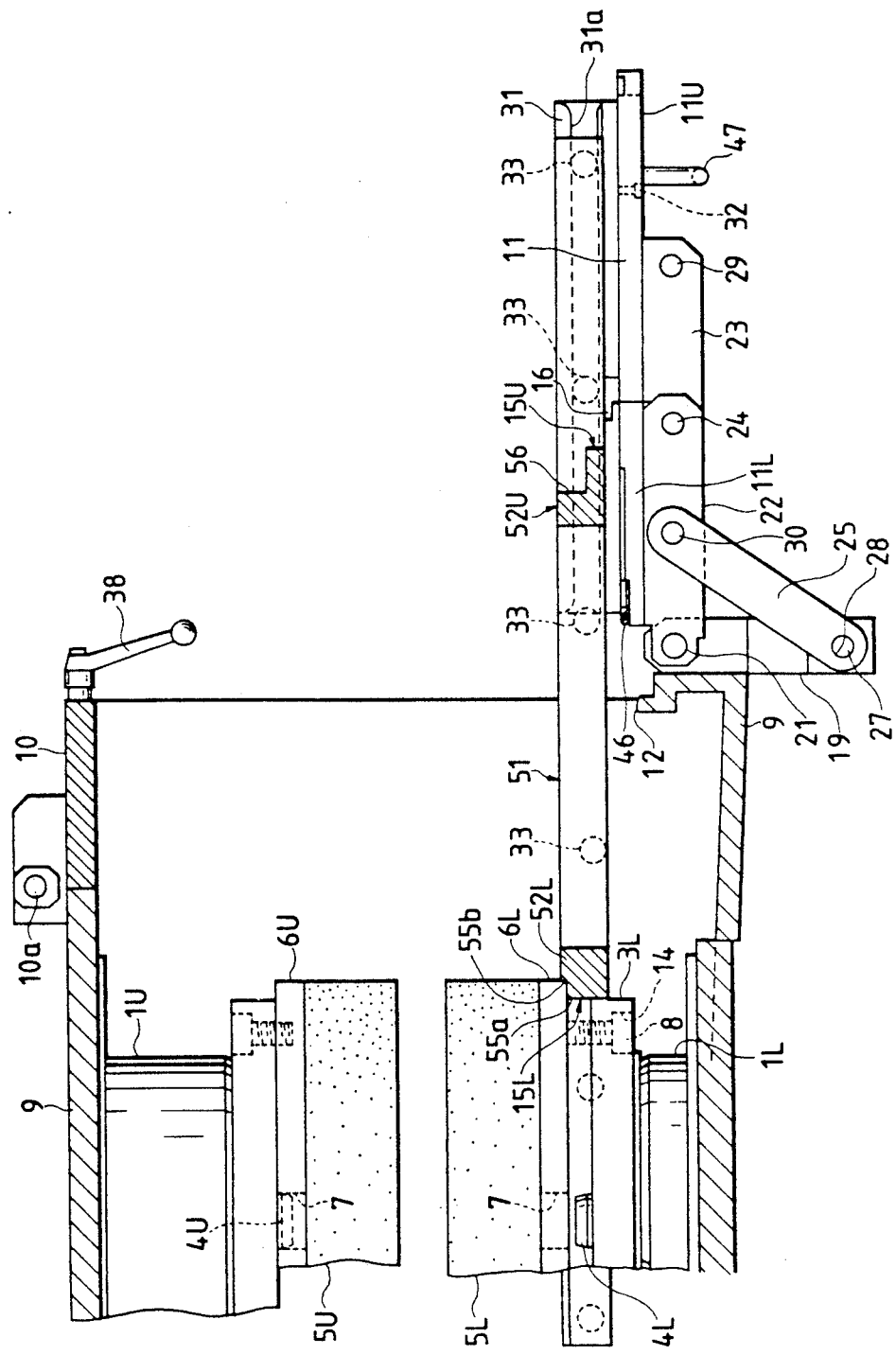

FIGS. 3 and 4 show the open condition of the lid 11. The lid 11 is pivotally connected to the cover member 9 at the lower edge portion of the opening 12. Support members (later described) for moving the guide rails 31 between an abrasive disc attachment/detachment position and an accommodated position are mounted on the outer surfaces of the cover member 9 and lid 11.

A lower link 22 is pivotally connected at its proximal end to a hinge 19 by a first horizontal shaft 21, the hinge 19 being fixedly secured to the cover member 9 at the lower edge portion of the opening 12. The lid 11 has an upper portion 11U and a lower portion 11L. The lower lid portion 11L is fixedly secured to the lower link 22. An upper link 23 is pivotally connected at its proximal end to the distal end of the lower link 22 by a second horizontal shaft 24. The upper lid portion 11U is fixedly secured to the upper link 23. Thus, the lid 11 can be rotated or angularly moved about the first and second shafts 21 and 24. Because of the provision of fixing means (later described) for fixing the two links 22 and 23 relative to each other, the lid 11 can assume a condition (FIG. 3) in which the lid 11 fully closes the opening 12, and also can assume another condition (FIG. 4) in which the lid 11 closes about a half of the opening 12 by the lower lid portion 11L, with the upper lid portion 11U disposed horizontally.

A pin 30 is mounted at a central portion of the lower link 22, and is movable along its axis. A stopper 26 (FIG. 5) is fixedly secured to the pin 30 for preventing the pin 30 from becoming disengaged from the lower link 22. A link 25 is fixedly secured to the pin 30. When the lower link 22 is disposed at an angle relative to the hinge 19 as shown in FIG. 3, a support pin 27 fixedly secured to the distal end of the link 25 is releaseably received in a support hole 28 formed in the lower end of the hinge 19. When only the upper lid portion 11U is opened and disposed horizontally as shown in FIG. 4, the support pin 27 is releaseably received in a support hole 29 formed in the distal end of the upper link 23.

As shown in FIG. 5, the guide rails 31 are fixedly mounted by bolts 32 on the opposite side portions of the back surface of the upper lid portion 11U, respectively. The guide rails 31 form a groove of a channel-shaped cross-section, and the opposed upper and lower surfaces of this groove serve as track surfaces 31a. Rollers 33 of the abrasive disc-carrying slide 51 can be received in the channel-shaped groove. The outer side surfaces 53a of the slide 51 are adapted to be in sliding contact respectively with the opposed surfaces 31b of the guide rails 31. Thus, the surfaces 31b serve to guide the sliding movement of the slide 51. The guide rail 31 is of a one-piece or unitary construction extending over the upper and lower lid portions 11U and 11L, and is slightly shorter than the vertical dimension of the opening 12. When the lid 11 is closed, the guide rail 31 is accommodated within the cover member 9 and disposed inwardly of the opening 12.

FIG. 6 is a cross-sectional view taken along the line A—A of FIG. 5, and an identical portion is also provided at the left-side portion (FIG. 5) of the machine. A threaded element 35 is received in a flange 34 fixedly secured to the lower lid portion 11L. The threaded element 35 has a threaded distal end 35a greater in diameter than its shank portion 35b received in the flange 34. The lower lid portion 11L has a hole 11l of such a size that the threaded portion 35a of the threaded element 35 can be inserted into the hole 11l. The threaded element 35 is fixedly secured to a knob 36 by a pin 37. The threaded portion 35a of the threaded element 35 can be threaded into the guide rail 31.

The lid 11 is releaseably fixed relative to the cover member 9 through a lid member 10 which is connected to the cover member 9 by a hinge 10a in such a manner that the lid member 10 is pivotally moved outwardly (see FIG. 2). Fastening screws 38 each having a handgrip are passed through respective holes 45 (which are formed through the upper lid portion 11U) and threaded into the edge of the lid member 10. The lid member 10 is provided for enhancing operability.

The lower lid portion 11L is releasably fixed relative to the cover member 9 by fastening screws 44 each having a handgrip. More specifically, as shown in FIG. 7 which is a cross-sectional view taken along the line B—B of FIG. 5, a clamp member 43 is rotatably mounted on a pin 39 threaded into the cover member 9. A thrust washer 42 is connected to the pin 39 by a bolt 41, and when the bolt 41 is tightened, the clamp member 43 is forced toward the cover member 9 through the thrust washer 42. The fastening screw 44 is threaded into one end portion of the clamp member 43, and when the fastening screw 44 is tightened, it is pressed against the lower lid portion 11L to fix the same to the cover member 9 as shown in phantom in FIG. 7. A stopper 16 is fixedly secured to the lower end of the upper lid portion 11U and disposed between the guide rails 31.

A packing 46 is mounted on the lid 11, and is engageable with the edge of the opening 12 outwardly of the guide rails 31 to provide a water-tight seal between the lid 11 and the edge of the opening 12.

Figure 8:
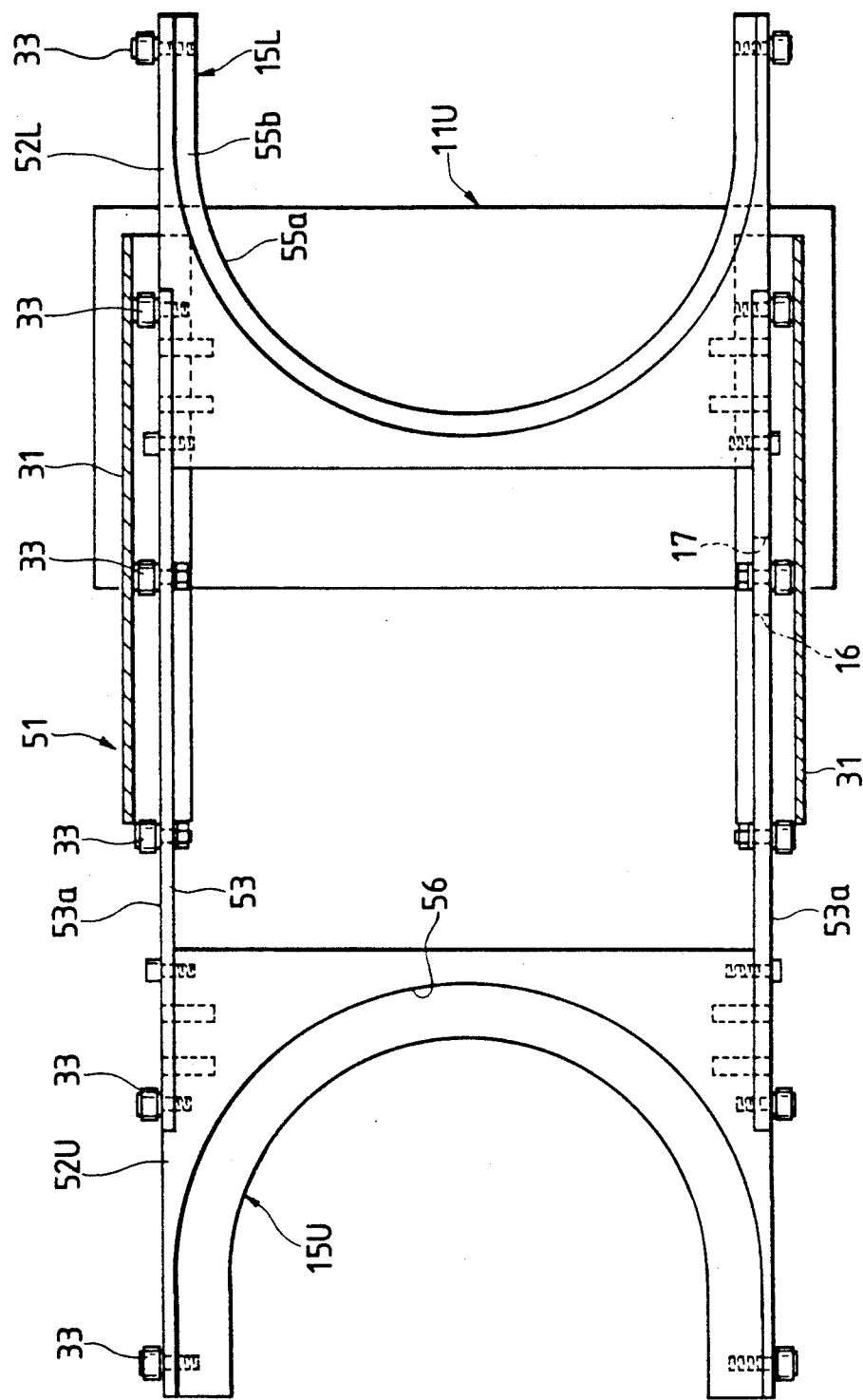
FIG. 8 is a plan view of a abrasive disc-carrying slide.

FIG. 8 is a plan view of the abrasive disc-carrying slide 51. The slide comprises holder members 52U and 52L, and a pair of connecting members 53 interconnecting the two holder members 52U and 52L by bolts, each connecting member 53 being in the form of a bar of a square cross-section. The holder member 52U serves to hold the upper abrasive disc 5U while the holder member 52L serves to hold the lower abrasive disc 5L. The plurality of rollers 33 for rolling engagement with the guide rail 31 are mounted on the outer 53a side of each connecting member 53.

The lower abrasive disc holder member 52L has the notch 15L opening to one end thereof remote from the upper abrasive disc holder member 52U. The notch 15L has a pair of opposed straight portions extending from the one end of the holder member 52L toward the other end thereof, and a semi-circular portion interconnecting the opposed straight portions. An inner periphery 55a defined by the opposed straight portions and the semi-circular portion is of such a size that the opposed straight portions can be closely fitted on the spindle flange 3L and be moved relative thereto, so that the spindle flange 3L can be fitted in the semi-circular portion. A guide notch 55b of a square cross-section is formed in the upper edge of the notch 15L over the entire region thereof. The guide notch 55b is of such a size that opposed straight portions of the guide notch 55b can be fitted on the outer periphery of the face plate 6L of the lower abrasive disc 5L and be moved relative thereto, so that the face plate 6L can be fitted in a semi-circular portion of the guide notch 55b. The outer marginal portion of the lower end face of the face plate 6L is adapted to rest on the bottom surface of the guide notch 55b.

The upper abrasive disc holder member 52U has the notch 15U opening to one end thereof remote from the lower abrasive disc holder member 52L. The notch 15U has a pair of opposed straight portions extending from the one end of the holder member 52U toward the other end thereof, and a semi-circular portion interconnecting the opposed straight portions. A guide notch 56 of a square cross-section is formed in the upper edge of the notch 15U over the entire region thereof. Opposed straight portions of the guide notch 56 are movable relative to the outer periphery of the upper abrasive disc 5U, so that the upper abrasive disc 5U can rest on a semi- circular portion of the guide notch 56.

The upper and lower abrasive discs 5U and 5L are attached respectively to the two spindles in opposed relation to each other, and are spaced a predetermined distance from each other. In this condition, the workpiece is fed in between the opposed abrasive discs 5U and 5L by a feed guide means (not shown), thereby grinding the workpiece. At this time, the lid 11 closes the opening 12. More specifically, the fastening screws 38 are threaded into the lid 10, so that the upper lid portion 11U is pressed toward the edge of the opening 12 of the cover member 9 through the packing 46. Each clamp member 43 is rotated about the pin 39 to face the lower lid portion 11L, and the fastening screw 44 is pressed against the lower lid portion 11L, so that the lower lid portion 11L is pressed toward the edge of the opening 12 through the packing 46. When the knob 36 is tightened, each guide rail 31 is fixed relative to the lower lid portion 11L, so that the upper and lower lid portions 11U and 11L jointly provide the unitary condition of the lid 11. The link 25 is moved away from the outer side of the lower link 22, and is moved about the pin 30 into a hanging or suspended position by its own weight, with the stopper 26 held against the lower link 22. The distal ends of the support pins 27 are spaced apart from the outer opposite side surfaces of the hinge 19.

In the present invention, only one of the upper and lower abrasive discs 5U and 5L can be attached to and detached from the mating spindle housing, and either of the two abrasive discs 5U and 5L can be exchanged first. If it is necessary to exchange only one of the two abrasive discs, this can be done.

In the condition shown in FIG. 2, when the lower abrasive disc 5L is to be exchanged, the fastening screws 38 are loosened to release the fixing between the upper and lower lid portions 11U -and 11L. Then, the fastening screws 44 are loosened, and each clamp member 43 is rotated about the pin 39 from the position indicated in a solid line (FIG. 5) to the position indicated in phantom. In this position, it is desirable to fasten the fastening screws 44 to the cover member 9 to hold the clamp members 43 against movement. When a handle 47 fixedly secured to the upper lid portion 11U is pulled, the lid 11 is rotated or angularly moved about the first horizontal shaft 21 in a clockwise direction (FIG. 2), and is disposed in a horizontal position as shown in FIG. 3. During the rotation of the lid 11, the link 25 is kept in its hanging condition. In the horizontal condition of the lid 11 (FIG. 3), each support pin 27 connected to the distal end of the link 25 is inserted into the lower hole 28 of the hinge 19 in a direction perpendicular to the sheet of FIG. 3. As a result, each guide rail 31 is fixed and directed toward the lower spindle flange 1L. All of the bolts 8 for connecting the face plate 6L to the spindle flange 3L are removed. The abrasive disc-carrying slide 51 is introduced into the guide rails 31, with the notch 15L directed toward the spindle flange 3L. The slide 51 is pushed until the inner periphery 55a of the notch 15L in the lower abrasive disc holder member 52L is brought into engagement with the outer periphery of the spindle flange 3L. At this time, the rollers 33 on the opposite sides of the slide 51 support the weight of the slide 51, and smoothly roll on the track surfaces 31a of the two guide rails 31. Also, the outer side surfaces 53a are held in sliding contact with the opposed surfaces 31b of the two guide rails 31, respectively. Therefore, the slide 51 moves toward the lower spindle flange 3L, with the longitudinal axis of the slide 51 coinciding with the center of the spindle flange 3L, so that the center of the semi-circular portion of the notch 15L is aligned with the axis of the spindle housing 1L. In this condition, the lower abrasive disc holder member 52L is disposed at a level lower than the face plate 6L.

Then, the spindle housing 1L is moved downward together with the lower abrasive disc 5L and the face plate 6L, so that the face plate 6L fits in and rests on the semi-circular portion of the guide notch 55b. Then, the spindle housing 1L is further moved downward, so that the centering projection 4L moves out of the center hole 7 of the face plate 6L. Then, the slide 51 is pulled or moved back, so that the slide 51 carrying the lower abrasive disc 5L and the face plate 6L is guided by and moves along the guide rails 31 toward the exterior of the grinding machine. When the abrasive disc 5L and the face plate 6L come to a position above the guide rails 31, the abrasive disc 5L with the face plate 6L is lifted by a crane.

For attaching a new lower abrasive disc 5L to the spindle housing 1L, the new abrasive disc 5L is lifted by the crane and is placed on the lower abrasive disc holder member 52L in such a manner that-the face plate 6L is fitted in the guide notch 55b of the notch 15L. Then, the abrasive disc 5L is pushed so that it is guided by the guide rails 31 and advances toward the spindle housing 1L. At this time, the opposed straight portions of the notch 15L of the lower abrasive disc holder member 52L advance, and the spindle flange 3L is fitted between these opposed straight portions, as shown in FIG. 3, thereby preventing the slide 51 from shaking laterally. Then, when the inner periphery 55a of the notch 15L of the holder member 52L is brought into engagement with the outer periphery of the spindle flange 3L, the axis or centerline of the lower abrasive disc 5L on the slide 51 is aligned with the axis of the lower spindle housing 1L. Then, the spindle housing 1L is moved upward, so the centering projection 4L is inserted into the central hole 7 in the face plate 6L. The upward movement of the spindle housing 1L is once stopped in such a manner that a slight space is provided between the spindle flange 3L and the face plate 6L. Then, the spindle flange 3L is slowly rotated with the hand, so that the bolt holes 14 are aligned respectively with the internally threaded holes formed in the face plate 6L. Then, the bolt 8 is loosely threaded into each pair of aligned holes. Then, the spindle housing 1L is moved upward to bring the spindle flange 3L into intimate contact with the face plate 6L, and then the spindle housing 1L is further moved upward slightly, so that the face plate 6L is spaced apart from the lower abrasive disc holder member 52L. Then, the slide 51 is withdrawn and is disengaged from the guide rails 31, and the bolts 8 are tightened to fix the lower abrasive disc 5L to the spindle housing 1L.

Next, the exchange of the upper abrasive disc 5U will now be described. In the condition shown in FIG. 2, each knob 36 is rotated and loosened, so that its threaded portion 35a is withdrawn from the guide rail 31. Then, the fastening screws 38 are loosened, and the lid member 10 is lifted, so that the fixing of the upper lid portion 11U relative to the lid member 10 (and hence the cover member 9) is released. Then, the handle 47 is pulled, so that the upper lid portion 11U is outwardly rotated or angularly moved about the second horizontal shaft 24 to be opened. When the upper lid portion 11U is disposed in a horizontal condition, the link 25 depends from the lower link 22 through the pin 30 and extends along the lower lid portion 11L. The link 25 is angularly moved upward about the pin 30, and the support pin 27 is inserted into the support hole 29, so that the upper lid portion 11U can support a load. In this condition, the guide rails 31 are extended from the upper lid portion 11U into the cover member 9.

Then, the abrasive disc-carrying slide 51 is introduced into the pair of guide rails 31, with the upper abrasive disc holder member 52U directed toward the upper abrasive disc 5U. The slide 51 is guided by the guide rails 31 and advances, and when a stopper 17 on the slide 51 abuts against the stopper 16, the notch 15U is disposed below the upper abrasive disc 5U in such a manner that the center of the semi-circular portion of the notch 15U is substantially aligned with the axis of the upper spindle housing 1U. Then, before the upper spindle housing 1U is moved downward, all the bolts 8 (which fixedly connect the face plate 6U and the spindle flange 3U together) except for one bolt 8 are removed. Then, the spindle flange 3U is slowly rotated with the hand so that the remaining bolt 8 is directed toward the opening 12.

Figure 9:
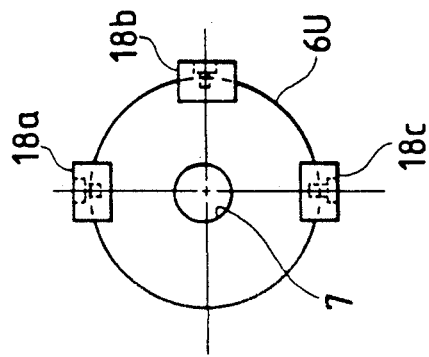
FIG. 9 is a cross-sectional view taken along the line C—C of FIG. 4.
Figure 12:
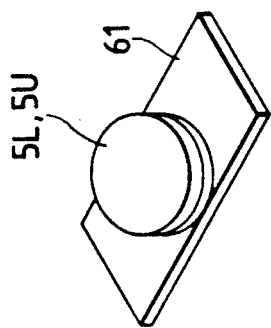
FIGS. 12 and 13 are views illustrative of the prior art.
Figure 13:
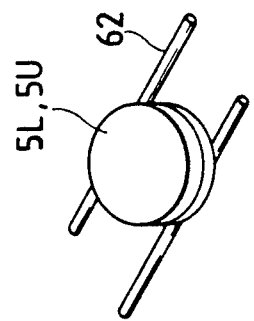

Then, the upper spindle housing 1U is moved downward, so that the upper abrasive disc 5U also descends together therewith. The upper abrasive disc 5U is further moved downward to be fitted in the guide notch 56. Immediately before the upper abrasive disc 5U rests on the upper abrasive disc holder member 52U, the downward movement of the upper spindle housing 1U is stopped. Then, the aforesaid remaining bolt 8 connecting the face plate 6U and the spindle flange 3U together is removed to cause the upper abrasive disc 5U to rest on the upper abrasive disc holder member 52U. Then, the spindle housing 1U is moved upward, so that the centering projection 4U is disengaged from the center hole 7 in the face plate 6U. Then, the slide 51 is pulled or moved back, so that the upper abrasive disc 5U with the face plate 6U is moved into a retracted position above the upper lid portion 11U. Then, the upper abrasive disc 5U is lifted by the crane and is disengaged from the upper abrasive disc holder member 52U. For attaching a new upper abrasive disc 5U to the upper spindle housing 1U, first, the new abrasive disc 5U having a new face plate 6U fixed thereto is placed by the crane on the slide 51 disposed in its retracted position, so that the abrasive disc 5U is fitted in the semi-circular portion of the guide notch 56 of the upper abrasive disc holder member 52U. Then, in order to achieve the accuracy of the centering of the upper abrasive disc 5U when it is attached to the spindle housing 1U, registration stoppers 18 are attached to the outer peripheral portion of the face plate 6U by bolts 20 threaded into threaded holes formed in the outer peripheral surface of the face plate 6U, as shown in FIG. 9.

Then, the slide 51 is pushed toward the spindle housing 1U, so that the slide 51 is guided by the guide rails 31 and advances. At this time, the positioning stoppers 18a and 18c (FIG. 9) advance with the spindle flange 3U fitted between the stoppers 18a and 18c, thereby preventing the abrasive disc 5U from shaking laterally. When the stopper 18b is brought into engagement with the outer peripheral surface of the spindle flange 3U, the axis of the upper abrasive disc 5U as well as the axis of the face plate 6U is aligned with the axis of the spindle housing 1U. Then, the upper spindle housing 1U is moved downward, so that the centering projection 4U is fitted in the central hole 7 of the face plate 6U. The downward movement of the spindle housing 1U is stopped in such a manner that a slight space is provided between the face plate 6U and the spindle flange 3U. Then, the spindle flange 3U is slowly rotated with the hand so that the bolt holes 14 are aligned with the mating threaded holes of the face plate 6U, respectively. Then, the bolts 8 are respectively passed through the bolt holes 14 and loosely threaded into the threaded holes of the face plate 6U. Then, the spindle housing 1U is further moved downward, and immediately before the face plate 6U is brought into contact with the spindle flange 3U, the bolts 8 are fully tightened. Then, the spindle housing 1U is moved upward, so that the upper abrasive disc 5U moves upward together with the spindle housing 1U and is disengaged from the upper abrasive disc holder member 52U. The positioning stoppers 18a to 18c which are no longer necessary are removed from the face plate 6U by loosening the bolts 20. Then, the slide 51 is moved outwardly, so that the slide 51 is guided by the guide rails 31 and can be withdrawn from the guide rails 31.

The upper lid portion 11U can be closed in a manner reverse to that of opening it.

The exchange of the upper abrasive disc 5U has been described above when the lid 11 is in its closed condition. For exchanging the upper abrasive disc 5U when the lid 11 is in its fully open condition as shown in FIG. 3, the link 25 is displaced in a direction perpendicular to the sheet of FIG. 3, so that the support pin 27 is disengaged from the hole 28 in the hinge 19. Then, the handle 47 is held by the hand and is angularly moved about the first horizontal shaft 21 in a counterclockwise direction (FIG. 3), so that the lid 11 closes the opening 12 of the cover member 9 since the lid 11 and the upper and lower links 23 and 22 are integrally fixed relative to one another. Then, the clamp member 43 is angularly moved about the pin 39 from the position indicated in phantom (FIG. 5) to the position indicated by the solid line, and when the fastening screw 44 is tightened, the lower lid portion 11L is pressed against the edge of the opening of the cover member 9 and fixed to the cover member 9. Then, the knob 36 is loosened, so that its threaded portion 35a is disengaged from the guide rail 31. Then, when the handle 47 is pulled, the upper lid portion 11U is angularly moved about the second horizontal shaft 24 to be opened. Thereafter, the operation is carried out according to the procedure described above with reference to FIG. 4.

Incidentally, when the lid 11 is opened to adjust or inspect the interior of the cover member 9 except for the exchange of the abrasive discs, the overall lid 11 can hang down by the horizontal shaft 21.

The above embodiment is directed to the vertical spindle double-head grinding machine. However, the above-mentioned problems are also encountered with a conventional vertical spindle single-head grinding machine, since a abrasive disc is slidingly moved on a guide plate or guide bars, fixed to the machine frame, when exchanging the abrasive disc, as is the case with the conventional vertical spindle double-head grinding machine, because the abrasive disc can not be brought directly to the spindle housing by a crane.

Figure 10:
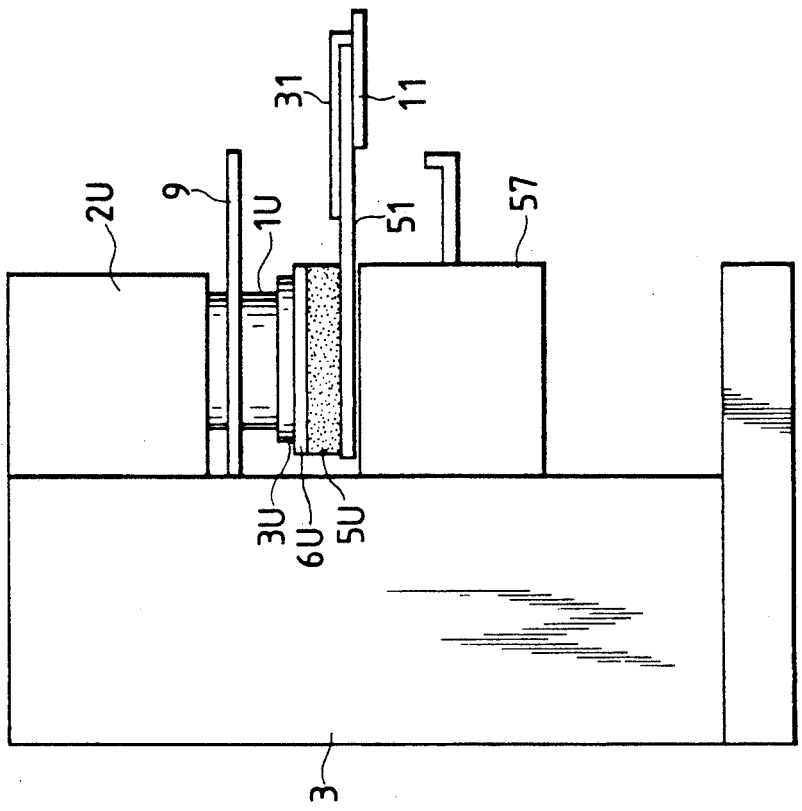
FIGS. 10 and 11 are side-elevational views of vertical-spindle single-head grinding machines incorporating modified abrasive disc exchange apparatuses, respectively.

FIG. 10 shows a vertical spindle single-head grinding machine incorporating an abrasive disc exchange apparatus of the present invention, the grinding machine including only an upper abrasive disc 5U. An abrasive disc-carrying slide 51 for moving the abrasive disc 5U toward and away from a spindle housing 1U is provided in this embodiment, and guide rails 31 are also provided for guiding the sliding movement of the slide 51 so as to exchange the abrasive disc 5U, as in the preceding embodiment (vertical spindle double-head grinding machine). A guide rail accommodating means is also provided on a lid 11 in a manner similar to that described for the preceding embodiment although this lid may not be limited to the type foldable in two.

Figure 11:
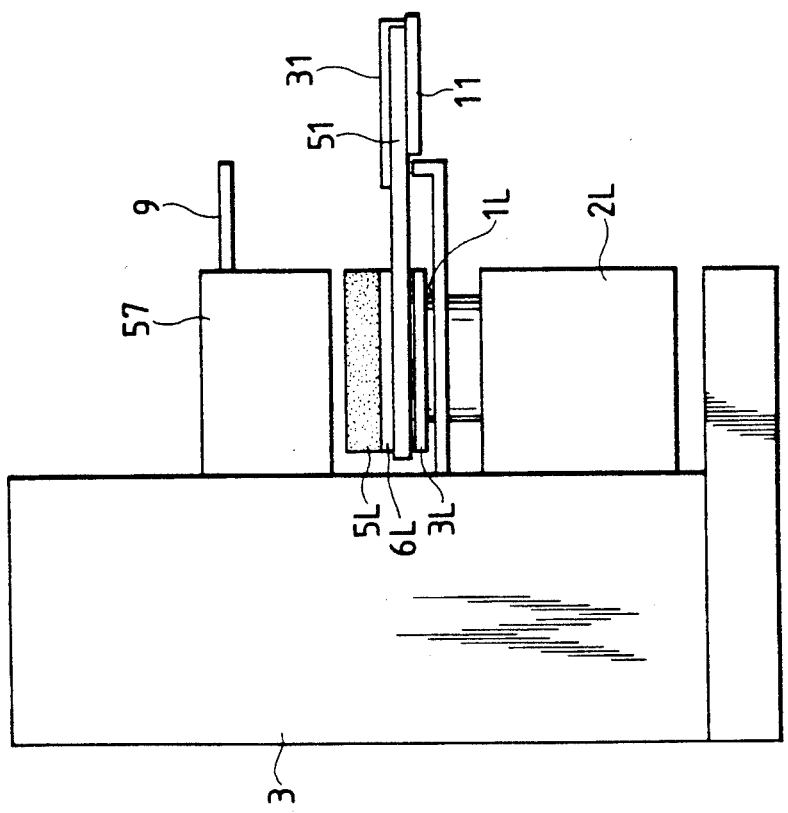

FIG. 11 shows a vertical spindle single-head grinding machine incorporating an abrasive disc exchange apparatus of the present invention, the grinding machine including only a lower abrasive disc 5L. A feed guide member 57 for feeding a workpiece onto the lower abrasive disc 5L is provided. Particularly when the grinding machine is of the special purpose-type, the feed guide member 57 is complicated and large in size. For this reason, the exchange of the abrasive disc can not be carried out directly by the use of a crane, and therefore an abrasive disc-carrying slide 51 for moving the abrasive disc 52 toward and away from a spindle housing 1L is provided in this embodiment, and guide rails 31 are also provided for guiding the sliding movement of the slide 51 so as to exchange the abrasive disc 5L, as in the first-mentioned embodiment (vertical spindle double-head grinding machine). A guide rail accommodating means is also provided on a lid 11 in a manner similar to that of the first-mentioned embodiment although this lid may not be limited to the type foldable in two.

As described above, according to the present invention, there is provided the abrasive disc exchange apparatus for use in a vertical spindle double-head grinding machine comprising the pair of opposed upper and lower spindle housings and the pair of upper and lower abrasive discs releasably attached respectively to the upper and lower spindle housings, the apparatus comprising:

(a) a cover member surrounding the upper and lower abrasive discs and having an opening disposed in a radial direction of the upper and lower abrasive discs for the passage of the abrasive discs therethrough, the cover member having a lid for closing the opening, and the lid being movable into an open position where the lid opens the opening;

(b) a guide rail;

(c) guide rail accommodating means for accommodating the guide rail;

(d) support means for holding the guide rail horizontally so as to allow the guide rail to extend toward a space between the upper and lower spindle housings when the lid is moved to its open position; and (e) an abrasive disc-carrying slide capable of carrying each of the upper and lower abrasive discs, the slide being engageable with the guide rail for movement therealong into and out of the space between the upper and lower spindle housings when the guide rail is disposed horizontally, and the slide having a pair of first and second positioning portions provided respectively at opposite ends thereof for holding the peripheral surfaces of the upper and lower abrasive discs respectively in first and second predetermined positions.

With this construction, the following advantages can be achieved:

(1) The abrasive disc to be exchanged is placed on the abrasive disc-carrying slide, and the abrasive disc or the face plate secured thereto is not in sliding contact with any associated part. Therefore, the abrasive disc, the face plate and any associated part will not be subjected to damage.

(2) The abrasive disc is placed on and carried by the slide which is guided by the guide rails. Therefore, the abrasive disc can be accurately moved toward and away from the spindle housing with a relatively small force, and can be accurately set in position. This achieves an enhanced safety and an enhanced operability, and reduces the time required for the exchange of the abrasive disc.

(3) Since there is provided the guide rail accommodating means, the grinding operation is not hindered. The guide rail accommodating means is associated with the vertical-spindle double-head grinding machine, and therefore the guide rail accommodating means will not be lost or missing during storage or the like, and the arrangement for the exchange can be made easily.

The guide rail accommodating means is provided on the inner or back surface of the lid which is movable outwardly into its open position. The support means is operable to hold the lid horizontally when the lid is in its open condition. With this construction, the guide rails can be fully accommodated within the cover member. Therefore, the guide rail accommodating means is not complicated in contrast with that provided separately from the lid. Moreover, the exchange apparatus itself is not displaced out of position.

The lid is pivotally connected at its lower end to the cover member at the lower edge portion of the opening through the first horizontal shaft. The guide rails are fixedly mounted on the lid, and the lid has the pair of upper and lower lid portions pivotally connected together through the second horizontal shaft so that the lid can be folded in two intermediate its upper and lower ends. The support means is operable to hold the lid in a first horizontal position when the lid is pivotally moved about the first horizontal shaft in its opening direction. The second positioning portion of the slide holds the peripheral surface of the lower abrasive disc in the second predetermined position when the lid is disposed in the first horizontal position. The support means is also operable to hold the upper lid portion in a second horizontal position when only the upper lid portion is opened. The first positioning portion holds the peripheral surface of the upper abrasive disc in the first predetermined position when the upper lid portion is disposed in the second horizontal position. With this construction, the guide rails can be set at either of the upper and lower horizontal positions, and this can be easily done by opening only the upper lid portion or by fully opening the entire lid. Therefore, the arrangements for the exchange of the upper and lower abrasive disc can be rapidly made independently of each other.

The support means comprises the upper and lower links fixedly mounted respectively to the outer surfaces of the upper and lower lid portions. The upper and lower links are connected together by the second horizontal shaft. The third link is pivotally connected at one end by the pin to the lower link intermediate the opposite ends of the lower link, the pin extending horizontally along the plane of the lid. The third link is movable relative to the lower link along the axis of the pin. The other end of the third link is releasably connectable to the upper end of the upper link through the second pin when only the upper lid portion is opened to its horizontal position. There is provided the hinge mounted on the cover member adjacent to the lower edge of the opening and extending downwardly along the outer surface of the lower link. The lower link is pivotally connected to the hinge by the first horizontal shaft, and the other end of the third link is releasably connectable to the lower end of the hinge by the second pin. With this construction, when the lid is in its closed position, the support means is disposed along the plane of the outer surface of the lid, and therefore is held in this inoperative position in a compact manner, thus hindering the operation. The support means is simple in construction and can accurately hold the lid in its operative position.

When the guide rails are set in each of the first and second operative positions for effecting the exchange of each of the upper and lower abrasive discs, the exchange is able to be carried out without the need for removing an associated feed guide member for feeding the workpiece into the space between the upper and lower abrasive discs. These first and second operative positions are optimal for the exchange of the abrasive discs. With this construction, when exchanging each abrasive disc, the abrasive disc can be brought into alignment with the spindle without the need for removing the feed guide member.

According to another aspect of the present invention, there is provided the abrasive disc exchange apparatus for use in a vertical spindle single-head grinding machine comprising a single spindle housing and a abrasive disc releasably attached to the spindle housing, the apparatus comprising:

(a) a cover member surrounding the abrasive disc and having an opening disposed in a radial direction of the abrasive disc for the passage of the abrasive disc therethrough, the cover member having a lid for closing the opening, and the lid being movable into an open position where the lid opens the opening;
(b) a guide rail;
(c) guide rail accommodating means for accommodating the guide rail;
(d) support means for holding the guide rail in a horizontal position so as to allow the guide rail to extend toward the spindle housing when the lid is moved to its open position; and
(e) an abrasive disc-carrying slide capable of carrying the abrasive disc, the slide being engageable with the guide rail for movement therealong toward and away from the spindle housing when the guide rail is disposed horizontally, and the slide having a positioning portion provided at one end thereof for holding the peripheral surface of the abrasive disc in a predetermined position.

With this construction, the following advantages can be achieved:

(1) The abrasive disc to be exchanged is placed on the abrasive disc-carrying slide, and the abrasive disc or the face plate secured thereto is not in sliding contact with any associated part. Therefore, the abrasive disc, the face plate and any associated part will not be subjected to damage.
(2) The abrasive disc is placed on and carried by the slide which is guided by the guide rails. Therefore, the abrasive disc can be accurately moved toward and away from the spindle housing with a small force, and can be accurately set in position. This achieves an enhanced safety and an enhanced operability, and reduces the time required for the exchange of the abrasive disc.
(3) Since there is provided the guide rail accommodating means, the abrasive disc exchange operation is not hindered. The guide rail accommodating means is associated with the vertical-spindle singlehead grinding machine, and therefore the guide rail accommodating means will not be lost or missing during storage, and the arrangement for the exchange can be made easily.

What is claimed is:

1. An abrasive disc exchange apparatus for use in a vertical spindle housing grinding machine comprising:
   a first spindle housing;
   a first abrasive disc releasably attached to the first spindle housing;
   a cover member surrounding the first abrasive disc and having an opening disposed in a radial direction of the first abrasive disc for the passage of said first abrasive disc therethrough, said cover member having a lid for closing said opening, and said lid being movable into an open position where said lid opens said opening;
   a pair of guide rails fixedly mounted on said lid;
   guide rail accommodating means for accommodating said guide rails when said lid closes said opening;
   support means for holding said guide rails in a horizontal position so as to allow said guide rails to extend toward the first spindle housing when said lid is moved to its open position; and
   an abrasive disc-carrying slide capable of carrying the first abrasive disc, said slide being engageable with said guide rails for movement therealong toward and away from the first spindle housing when said guide rails are disposed horizontally, and said slide having a first positioning portion provided at one end thereof for holding the peripheral surface of the first abrasive disc in a first predetermined position.

2. Apparatus according to claim 1 further comprising:
   a second spindle housing; and
   a second abrasive disc releaseably attached to the second spindle housing;
   in which said slide is capable of carrying each of the first and second abrasive discs and further comprises a second positioning portion provided at the other end for holding the peripheral surface of the second abrasive disc in a second predetermined position.

3. Apparatus according to claim 1, in which said guide rail accommodating means is provided on the inner surface of said lid, said lid being movable outwardly into its open position, and said support means being operable to hold said lid horizontally when said lid is in its open condition.

4. Apparatus according to claim 3, in which said lid is pivotally connected at its first end to said cover member at a first edge portion of said opening through a first horizontal shaft, said support means being operable to hold said lid in a first horizontal position when said lid is pivotally moved about said first horizontal shaft in its opening direction, said first positioning portion holding the peripheral surface of the first abrasive disc in said first-predetermined position when said lid is disposed in said first horizontal position.

5. Apparatus according to claim 4, in which said lid has a pair of upper and lower lid portions pivotally connected together through a second horizontal shaft so that said lid can be folded in two intermediate its upper and lower ends, said support means being operable to hold said upper lid portion in a second horizontal position when only said upper lid portion is opened, and said second positioning portion holding the peripheral surface of the second abrasive disc in said second predetermined position when said upper lid portion is disposed in said second horizontal position.

6. Apparatus according to claim 5, in which said support means comprises upper and lower links fixedly mounted respectively to outer surfaces of said upper and lower lid portions, said upper and lower links being connected together by said second horizontal shaft, a third link being pivotally connected at one end by a pin to said lower link intermediate the opposite ends of said lower link, said pin extending horizontally along the plane of said lid, said third link being movable relative to said lower link along the axis of said pin, the other end of said third link being releasably connectable to an upper end of said upper link through a second pin when only said upper lid portion is opened to its horizontal position, there being provided a hinge mounted on said cover member adjacent to the lower edge of said opening and extending downwardly along an outer surface of said lower link, said lower link being pivotally connected to said hinge by said first horizontal shaft, and the other end of said third link being releasably connectable to said hinge by said second pin.

7. Apparatus according to claim 2, in which when said guide rails are set in each of first and second operative positions for effecting the exchange of each of the first and second abrasive discs, said exchange being able to be carried out without the need for removing an associated feed guide member for feeding a workpiece into the space between said first and second abrasive discs.

* * * * *